US010931750B1

(12) United States Patent
Labovich et al.

(10) Patent No.: US 10,931,750 B1
(45) Date of Patent: Feb. 23, 2021

(54) SELECTION FROM DEDICATED SOURCE VOLUME POOL FOR ACCELERATED CREATION OF BLOCK DATA VOLUMES

(71) Applicant: Amazon Technologies, Inc., Seattle, WA (US)

(72) Inventors: Pavel Labovich, Bothell, WA (US); Colin Williams, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 92 days.

(21) Appl. No.: 16/049,620

(22) Filed: Jul. 30, 2018

(51) Int. Cl.
*G06F 15/16* (2006.01)
*H04L 29/08* (2006.01)
*G06F 16/11* (2019.01)

(52) U.S. Cl.
CPC ........ *H04L 67/1095* (2013.01); *G06F 16/128* (2019.01)

(58) Field of Classification Search
CPC .......... H04L 67/1095; H04L 29/08072; H04L 29/06; H04L 29/08135; G06F 16/128
See application file for complete search history.

(56) References Cited

U.S. PATENT DOCUMENTS

| 5,434,994 | A | 7/1995 | Shaheen et al. |
| 5,574,878 | A | 11/1996 | Onodera et al. |
| 6,463,509 | B1 | 10/2002 | Teoman et al. |
| 7,502,960 | B1 * | 3/2009 | Todd .................... G06F 3/0617 714/13 |
| 7,788,664 | B1 | 8/2010 | Janakiraman et al. |
| 7,895,261 | B2 | 2/2011 | Jones et al. |
| 7,975,102 | B1 | 7/2011 | Hyer et al. |
| 8,280,853 | B1 | 10/2012 | Lai et al. |
| 8,285,687 | B2 | 10/2012 | Voll et al. |

(Continued)

FOREIGN PATENT DOCUMENTS

| WO | WO 2011/088261 A3 | 7/2011 |
| WO | WO 2017/028885 A1 | 2/2017 |
| WO | WO 2019/212768 A1 | 7/2019 |

OTHER PUBLICATIONS

NLP IP (https://iq.ip.com/discover search results) (Year: 2020).*

(Continued)

*Primary Examiner* — Razu A Miah
(74) *Attorney, Agent, or Firm* — Knobbe, Martens, Olson & Bear, LLP

(57) ABSTRACT

Generally described, one or more aspects of the present application correspond to techniques for new block store volumes of data from object storage snapshots of an origin volume by creating an intermediary "acceleration pool" of source volumes reserved for supporting the new volume creation process. The source volumes may be prevented from supporting user I/O or computing instances in order to reserve their bandwidth for the transfer of data to the new volumes. In addition, the source volumes can be stored on block store servers to increase the speed with which their data can be transferred to the new volumes. The acceleration pool can be partitioned among users accessing the pool in order to maintain availability even when some users heavily utilize the acceleration pool, with particular source volumes intelligently selected from among a user's partition in order to optimize the speed at which the new volumes are created.

13 Claims, 8 Drawing Sheets

(56) References Cited

U.S. PATENT DOCUMENTS

| | | | |
|---|---|---|---|
| 8,589,574 B1* | 11/2013 | Cormie | G06F 3/0667 |
| | | | 709/230 |
| 8,688,660 B1 | 4/2014 | Sivasubramanian et al. | |
| 8,725,968 B2 | 5/2014 | Wada | |
| 8,849,758 B1 | 9/2014 | Sivasubramanian et al. | |
| 9,003,227 B1 | 4/2015 | Patel et al. | |
| 9,110,600 B1 | 8/2015 | Brooker et al. | |
| 9,246,996 B1 | 1/2016 | Brooker et al. | |
| 9,503,517 B1 | 11/2016 | Brooker et al. | |
| 9,563,385 B1 | 2/2017 | Kowalski et al. | |
| 9,665,307 B1 | 5/2017 | LeCrone et al. | |
| 9,823,840 B1* | 11/2017 | Brooker | G06F 3/0631 |
| 9,826,030 B1 | 11/2017 | Dhoolam et al. | |
| 9,946,604 B1 | 4/2018 | Glass | |
| 10,452,296 B1 | 10/2019 | Greenwood et al. | |
| 10,459,655 B1 | 10/2019 | Greenwood et al. | |
| 10,768,850 B2 | 9/2020 | Muniswamy-Reddy et al. | |
| 2002/0059253 A1 | 5/2002 | Albazz et al. | |
| 2002/0144070 A1 | 10/2002 | Watanabe et al. | |
| 2003/0028737 A1 | 2/2003 | Kaiya et al. | |
| 2003/0050974 A1* | 3/2003 | Mani-Meitav | G06F 16/9574 |
| | | | 709/203 |
| 2003/0191930 A1 | 10/2003 | Viljoen et al. | |
| 2003/0204597 A1* | 10/2003 | Arakawa | G06F 21/80 |
| | | | 709/226 |
| 2004/0078419 A1 | 4/2004 | Ferrari et al. | |
| 2005/0193113 A1* | 9/2005 | Kokusho | H04L 67/1008 |
| | | | 709/225 |
| 2008/0086616 A1 | 4/2008 | Asano et al. | |
| 2008/0126699 A1 | 5/2008 | Sangapu et al. | |
| 2008/0140905 A1 | 6/2008 | Okuyama et al. | |
| 2009/0222632 A1 | 9/2009 | Sasage et al. | |
| 2009/0228889 A1 | 9/2009 | Yoshida | |
| 2009/0249470 A1 | 10/2009 | Litvin et al. | |
| 2010/0037009 A1 | 2/2010 | Yano et al. | |
| 2010/0070725 A1 | 3/2010 | Prahlad et al. | |
| 2010/0191922 A1 | 7/2010 | Dickey et al. | |
| 2010/0312983 A1 | 12/2010 | Moon et al. | |
| 2011/0191554 A1* | 8/2011 | Sakai | G06F 3/0689 |
| | | | 711/162 |
| 2012/0030318 A1* | 2/2012 | Ryder | H04L 67/1095 |
| | | | 709/220 |
| 2012/0030343 A1* | 2/2012 | Ryder | G06F 9/4856 |
| | | | 709/224 |
| 2012/0079221 A1 | 3/2012 | Sivasubramanian et al. | |
| 2012/0079505 A1* | 3/2012 | Tarta | G06F 9/466 |
| | | | 719/314 |
| 2012/0215835 A1* | 8/2012 | Takano | H04W 4/50 |
| | | | 709/203 |
| 2012/0254687 A1 | 10/2012 | Leggette et al. | |
| 2012/0303576 A1 | 11/2012 | Calder et al. | |
| 2013/0007753 A1 | 1/2013 | Jain | |
| 2013/0036091 A1 | 2/2013 | Provenzano et al. | |
| 2013/0046966 A1 | 2/2013 | Chu et al. | |
| 2013/0054890 A1 | 2/2013 | Desai et al. | |
| 2013/0055248 A1 | 2/2013 | Sokolinski et al. | |
| 2013/0086585 A1 | 4/2013 | Huang et al. | |
| 2013/0104126 A1 | 4/2013 | Padmanabhuni et al. | |
| 2013/0198459 A1 | 8/2013 | Joshi et al. | |
| 2013/0268575 A1* | 10/2013 | Xu | G06F 3/048 |
| | | | 709/202 |
| 2013/0304903 A1* | 11/2013 | Mick | H04L 43/0817 |
| | | | 709/224 |
| 2014/0136482 A1* | 5/2014 | Rochette | G06F 9/5083 |
| | | | 707/634 |
| 2014/0181046 A1 | 6/2014 | Pawar et al. | |
| 2014/0280441 A1* | 9/2014 | Jacobson | H04L 67/10 |
| | | | 709/201 |
| 2014/0351636 A1 | 11/2014 | Yin et al. | |
| 2014/0359130 A1 | 12/2014 | Southern et al. | |
| 2015/0134615 A1* | 5/2015 | Goodman | G06F 3/0644 |
| | | | 707/639 |
| 2015/0134723 A1* | 5/2015 | Kansal | H04L 67/1031 |
| | | | 709/203 |
| 2015/0139168 A1* | 5/2015 | Zhi | H04L 1/1835 |
| | | | 370/329 |
| 2015/0160885 A1* | 6/2015 | Hara | G06F 3/0665 |
| | | | 710/74 |
| 2015/0286432 A1* | 10/2015 | Dain | G06F 11/1448 |
| | | | 711/103 |
| 2015/0370483 A1 | 12/2015 | Schoebel-Theuer | |
| 2016/0036938 A1* | 2/2016 | Aviles | H04L 69/16 |
| | | | 709/213 |
| 2016/0224244 A1* | 8/2016 | Gensler, Jr. | G06F 3/0619 |
| 2016/0291889 A1 | 10/2016 | Dawson et al. | |
| 2017/0024764 A1* | 1/2017 | Mooser | G06Q 30/0275 |
| 2017/0237809 A1* | 8/2017 | Farinacci | G06F 9/5083 |
| | | | 718/104 |
| 2017/0329528 A1 | 11/2017 | Wei et al. | |
| 2018/0173874 A1 | 6/2018 | Muttik et al. | |
| 2018/0329935 A1* | 11/2018 | Mugali | G06N 20/00 |
| 2019/0042636 A1 | 2/2019 | Sipka et al. | |
| 2019/0332268 A1 | 10/2019 | Greenwood et al. | |
| 2019/0332269 A1 | 10/2019 | Greenwood et al. | |
| 2020/0142596 A1 | 5/2020 | Greenwood et al. | |

OTHER PUBLICATIONS

"Amazon EBS API and Command Overview", downloaded Jul. 11, 2013 from dov.aws.amazon.com/AWSEC2/latest/UserGuide/ebs-api-cli-overview.html, p. 1.

"AMI Basics" downloaded Jul. 11, 2013 from doc.aws.amazon.com/AWSEC2/latest/UserGuide/ComponentsAMIs.html, p. 1-2.

"AWS Amazon Elastic Block Store (EBS)—Persistent Storage" downloaded Jul. 11, 2013 from aws.amazon.com/ebs/ pp. 1-4.

"Cloudiquity" Published Mar. 12, 2009, Amazon Web Services and Cloud, pp. 1-4.

"Feature Guide: Elastic Block Store: Articles & Tutorials: Amazon Web Services" downloaded Jul. 11, 2013 from aws.amazon.com/articlse/1667, pp. 1-7.

HP; Chris Hyser et al.; Autonomic Virtual Machine Placement in the Data Center; pp. 1-10, Feb. 26, 2008; HP Laboratories.

Reich et al. 'VMTorrent: Scalable P2p Virtual Machine Streaming Dec. 10-13, 2012.

Search Report and Written Opinion issued in PCT/US2019/028320, dated Jul. 8, 2019.

VMware; Carl Waldspurger; Memory Resource Management in VMware ESX Server; pp. 1-24, Dec. 10, 2002.

* cited by examiner

SELECTION FROM DEDICATED SOURCE VOLUME POOL FOR ACCELERATED CREATION OF BLOCK DATA VOLUMES

BACKGROUND

Cloud computing, in general, is an approach to providing access to information technology resources through services, such as Web services, where the hardware and/or software used to support those services is dynamically scalable to meet the needs of the services at any given time. In cloud computing, elasticity refers to network-delivered computing resources that can be scaled up and down by the cloud service provider to adapt to changing requirements of users. The elasticity of these resources can be in terms of processing power, storage, bandwidth, etc. Elastic computing resources may be delivered automatically and on-demand, dynamically adapting to the changes in resource requirement on or within a given user's system. For example, a user can use a cloud service to host a large online streaming service, setup with elastic resources so that the number of webservers streaming content to users scale up to meet bandwidth requirements during peak viewing hours, and then scale back down when system usage is lighter.

A user typically will rent, lease, or otherwise pay for access to resources through the cloud, and thus does not have to purchase and maintain the hardware and/or software to provide access to these resources. This provides a number of benefits, including allowing users to quickly reconfigure their available computing resources in response to the changing demands of their enterprise, and enabling the cloud service provider to automatically scale provided computing service resources based on usage, traffic, or other operational needs. This dynamic nature of network-based computing services, in contrast to a relatively infrastructure of on-premises computing environments, requires a system architecture that can reliably re-allocate its hardware according to the changing needs of its user base.

DETAILED DESCRIPTION

Figure 1A:
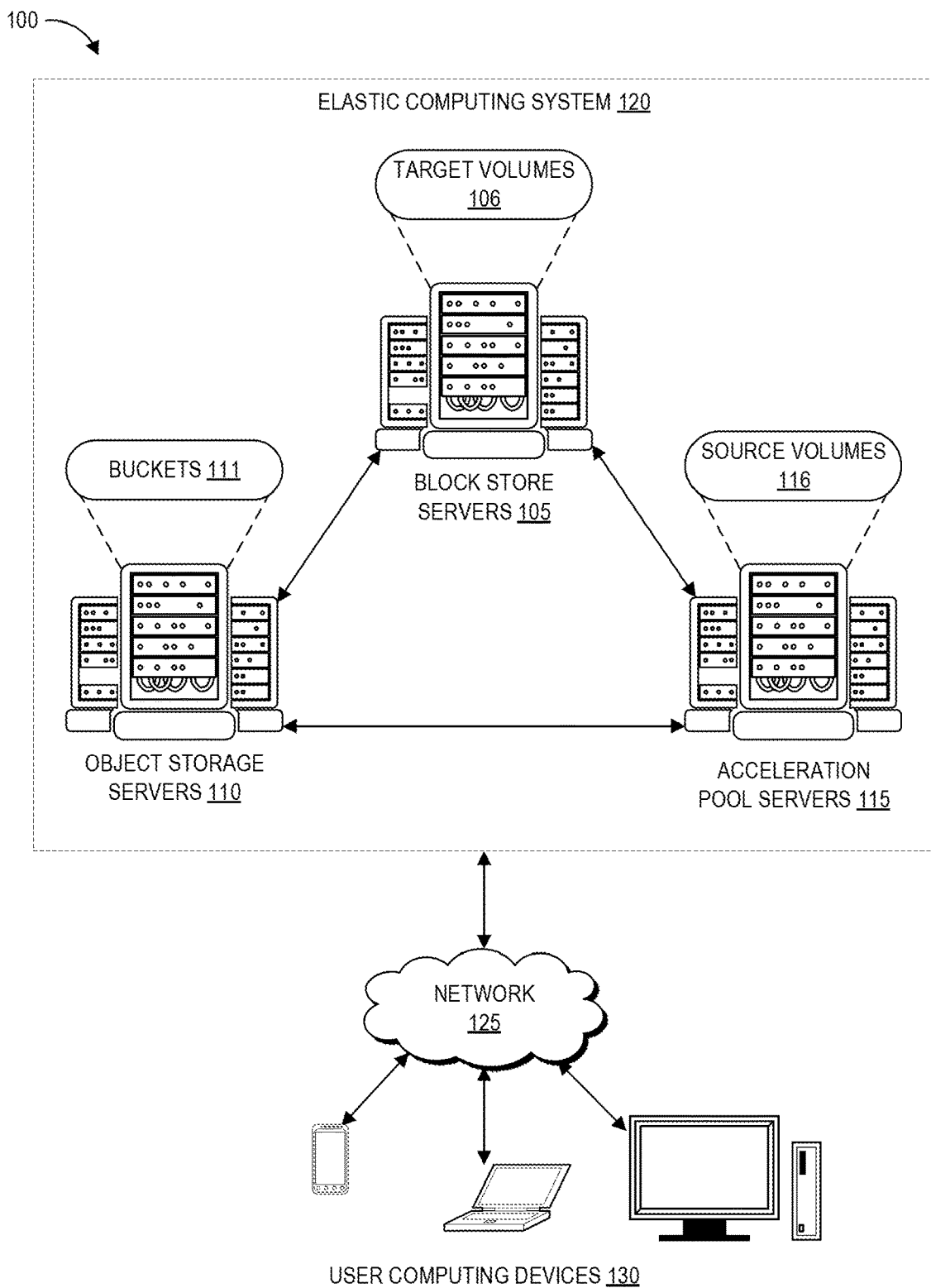
FIG. 1A depicts a schematic diagram of an elastic computing system in which various embodiments according to the present disclosure can be implemented.

Generally described, the present disclosure relates to the creation and management of data replica instances, for example of volumes of data stored using block storage within a networked elastic computing system. A user can take a "snapshot" of a volume that represents a point-in-time copy of the data of the volume. Typically, these snapshots are stored in a different data format and on separate computer hardware from the volume itself. That same user or other users can make copies of the volume, whereby the data is fed to these copies from the snapshot. However, the rate at which that data that can be transferred from the snapshot to a new volume is limited, often resulting in long latencies before the new volume creation is completed. These latencies can be exacerbated if multiple new volumes are created in parallel from the snapshot.

The aforementioned problems, among others, are addressed in some embodiments by the disclosed techniques for accelerating the creation of volumes from a snapshot by creating and using a dedicated acceleration pool as the data source for the new volumes. The disclosed technology beneficially provides a mechanism for accelerating creation of a new volume for a given user while minimizing the risk that another user's new volume creation may overwhelm the data transmission bandwidth. For example, the disclosed techniques can detect that a user associated with a snapshot has indicated that they would like to accelerate new volume creation from that snapshot. In response, the disclosed techniques can create an acceleration pool including source volumes based on the snapshot, where such source volumes can be read-only block storage replicas of the data of the snapshot. When a user requests to create one or more new volumes from the accelerated snapshot, the disclosed techniques can assign a subset of the source volumes in the acceleration pool for use by that user. This subset represents the portion of the acceleration pool that is available for feeding new volumes for that user. Different requesting users can be assigned different subsets so that the likelihood is minimized of one user's usage of the acceleration pool overwhelming other users' usages of the acceleration pool. One source volume of the subset can be selected for transmitting data to a given new volume, rather than having the snapshot transmit that data. The block storage source volumes can support more rapid replication of their data to new volumes than the snapshot. As such, the disclosed techniques can beneficially speed up the transfer of snapshot data to one or more new block storage volumes.

For example, a user may wish to make their volume of data available for use by other users within a distributed computing system. This user can take a snapshot of the volume and designate it for acceleration. Thereafter, the distributed computing system can create the acceleration pool of source volumes from the snapshot. When other users of the distributed computing system request to make a copy of the snapshot, their request can be supported from the acceleration pool. This can reduce the amount of time required to fully hydrate (i.e., create a volume from an object, which may include moving the snapshot from one storage location to another location, decompressing the snapshot, converting the snapshot from one format to another, etc.) a new volume with the data of the snapshot, and also support the parallel creation of many new volumes from the same snapshot.

As would be appreciated by one of skill in the art, the use of a dedicated source volume pool to enable more rapid creation of volume replicas, as disclosed herein, represents a significant technological advance over prior implementations. Specifically, the use of the dedicated pool for accelerated volume creation results in a significant reduction in the amount of time required to create a new volume. As an example, a volume of 1 terabyte (TB) of data can take hours to create directly from a snapshot, however using the disclosed techniques the creation time is reduced to around 30 minutes. This increased speed for creating the new volumes also reduces the chance of a "get fault" and its associated latencies, where a "get fault" occurs when a user of the new volume requests to use a block of data from their new volume before it has been copied into the new volume. Further, the use of the acceleration pool can support a large number of simultaneous new volume creation requests, for example hundreds or thousands. Moreover, the partitioning of the pool for different users accessing the pool beneficially maintains the availability of source volume resources for individual users, even when a particular user is heavily utilizing the acceleration pool for target volume creation. As such, the embodiments described herein represent significant improvements in computer-related technology.

Various aspects of the disclosure will now be described with regard to certain examples and embodiments, which are intended to illustrate but not limit the disclosure. Although the examples and embodiments described herein will focus, for the purpose of illustration, specific calculations and algorithms, one of skill in the art will appreciate the examples are illustrate only, and are not intended to be limiting. For example, although the acceleration techniques are described with respect to snapshots of block store volumes, they can also be used for other types of data, including snapshots of computing instances. In addition, although described in the context of an elastic computing system, the disclosed acceleration techniques can be implemented in other suitable data-hosting networked computing environments.

Overview of Example Computing Environment with Acceleration Pools

FIG. 1A depicts an example computing environment 100 including an elastic computing system 120 in which the disclosed new volume acceleration techniques can be implemented. The elastic computing system 120 can be accessed by user devices 130 over a network 125. The elastic computing system 120 includes one or more acceleration pool servers 115, one or more object storage servers 110, and one or more block store servers 105 that are in networked communication with one another and with the network 125 to provide users with on-demand access to computing resources including volumes 111 and buckets 106, among others. These particular resources are described in further detail below. Some implementations of elastic computing system 120 can additionally include elastic compute servers providing computing resources (referred to as "instances"), domain name services ("DNS") servers, relational database servers, and other server configurations (not illustrated) for supporting on-demand cloud computing platforms. Each server includes hardware computer memory and/or processors, an operating system that provides executable program instructions for the general administration and operation of that server, and a computer-readable medium storing instructions that, when executed by a processor of the server, allow the server to perform its intended functions.

The elastic computing system 120 can provide on-demand, scalable computing platforms to users through the network 125, for example allowing users to have at their disposal scalable instances, such as "virtual computing devices" via their use of the object storage servers 110 and block store servers 105. These virtual computing devices have attributes of a personal computing device including hardware (various types of processors, local memory, random access memory ("RAM"), hard-disk and/or solid state drive ("SSD") storage), a choice of operating systems, networking capabilities, and pre-loaded application software. Each virtual computing device may also virtualize its console input and output ("I/O") (e.g., keyboard, display, and mouse). Users can connect to their virtual computing device using a secure shell (SSH) application, or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires. Users can choose to deploy their virtual computing systems to provide network-based services for their own use and/or for use by their customers or clients.

The elastic computing system 120 can be provided across a number of geographically separate regions, for example to provide users with lower latencies by having their virtual computing devices in or near their geographic location. Each region is physically isolated from and independent of every other region in terms of location and power supply, and may communicate data with the other regions through the network 125 (e.g., the Internet). In an example embodiment, a region can include two or more availability zones each backed by one or more physical data centers provided with redundant and separate power, networking and connectivity to reduce the likelihood of two zones failing simultaneously. While a single availability zone can span multiple data centers, in an embodiment, no two availability zones share a data center. This can protect users from data-center level failures. A data center refers to a physical building or enclosure that houses and provides power and cooling to one or more of the acceleration pool servers 115, object storage servers 110, and block store servers 105. In an embodiment where the service provider uses availability zones, data centers within an availability zone and the availability zones within a region can be connected to one another through private, low-latency links, for example fiber optic network cables. This compartmentalization and geographic distribution of computing hardware enables the elastic computing system 120 to provide fast service to users on a global scale with a high degree of fault tolerance and stability. To distribute resources evenly across the zones in a given region, the provider of the elastic computing system 120 may independently map availability zones to identifiers for each user account.

The elastic computing system 120 can communicate over network 125 with user devices 130. The network 125 can include any appropriate network, including an intranet, the Internet, a cellular network, a local area network or any other such network or combination thereof. In the illustrated embodiment, the network 125 is the Internet. Protocols and components for communicating via the Internet or any of the other aforementioned types of communication networks are known to those skilled in the art of computer communications and thus, need not be described in more detail herein.

User computing devices 130 can include any network-equipped computing device, for example desktop computers, laptops, smartphones, tablets, e-readers, gaming consoles, and the like. Users can access the elastic computing system 120 via their computing devices 130, over the network 125, to view or manage their data and computing resources, as well as to use websites and/or applications hosted by the elastic computing system 120.

Turning specifically to the roles of the different servers within the elastic computing system 120, the block store servers 105 provide persistent data storage in the form of volumes 106. In FIG. 1A, these are shown as target volumes 106 that can be created based on the data of snapshots as described herein. The block store servers 105 include one or more servers on which volume data is stored in as blocks. A block is a sequence of bytes or bits, usually containing some whole number of records, having a maximum length of the block size. Blocked data is normally stored in a data buffer and read or written a whole block at a time. Blocking can reduce overhead and speed up the handling of the data-stream. Each block is assigned a unique identifier by which it can be stored and retrieved, but typically is not assigned metadata providing further context.

User volumes 106, which can be treated as an individual hard drive ranging for example from 1 GB to 1 terabyte TB in size, are made of one or more blocks stored on the block store servers 105. Although treated as an individual hard drive, it will be appreciated that the hardware storing a volume may not actually be a hard drive, but instead may be one or more virtualized devices implemented on one or more underlying physical host devices. Volumes 106 may be partitioned a number of times (e.g., up to 16) with each partition hosted by a device of the elastic computing system 120. The block store servers 105 are configured to mirror the content of block devices between servers 105 and synchronously replicate data across redundant servers. For example, the block store servers 105 can have built-in redundancy for volumes by replicating the volume across multiple servers within an availability zone (e.g., a primary replica and a synchronous secondary replica), which means that volumes will not fail if an individual drive fails or some other single failure occurs. The primary and secondary replicas can support user reads and writes (input/output operations, or "I/O operations"), and thus the block store servers 105 can be accessible to the user computing devices 130 over the network 125.

In some implementations, the acceleration pool volumes may be highly partitioned (e.g., up to a thousand times of more). For instance, for fault tolerance and data redundancy, volumes can typically be stored in block storage as a primary and secondary replica that share the same partitioning structure and update synchronously with one another. The elastic computing environment 120 can create additional, highly partitioned replicas of the volume. The highly partitioned replica can be stored using a containerized database structure in some implementations, with different partitions stored on different computer hardware from one another (though in some scenarios a certain number of the partitions may be stored in the same container). This can, for example, speed up hydration by using the highly partitioned replica as a source instead of the primary or secondary replicas as the source, which also beneficially frees up the primary and secondary replicas for handling user I/O operations. Various implementations may update the highly partitioned replica synchronously or asynchronously with the primary and secondary replicas, or may maintain the highly partitioned replica as a point-in-time copy of the primary and secondary replicas.

The object storage servers 110 represent another type of storage within the elastic computing environment 120. The object storage servers 110 include one or more servers on which data is stored as objects within resources referred to as buckets 111. Each object typically includes the data being stored, a variable amount of metadata that enables various capabilities for the object storage servers 110 with respect to analyzing a stored object, and a globally unique identifier or key that can be used to retrieve the object. Objects stored on the object storage servers 110 are associated with a unique identifier, so authorized access to them can be obtained through requests from networked computing devices in any location. Each bucket 111 is associated with a given user account. Users can store as many objects as desired within their buckets 111, can write, read, and delete objects in their buckets, and can control access to their buckets and the contained objects. Further, in embodiments having a number of different object storage servers 110 distributed across different ones of the regions described above, users can choose the region (or regions) where a bucket 111 is stored, for example to optimize for latency. Users can use object storage servers 110 for purposes such as storing photos on social media websites, songs on music streaming websites, or files in online collaboration services, to name a few examples. Applications developed in the cloud often take advantage of object storage's vast scalability and metadata characteristics.

The object storage servers 110 can offer even greater redundancy than the block store servers 105, as the object storage servers 110 can automatically replicate data into multiple availability zones. The object storage servers 110 also have different data throughput than the block store servers 105, for example around 20 Mbps for a single stream of data. While the object storage servers 110 can be used independently from the volumes described above, they can also be used to provide data backup as described herein with respect to snapshots (e.g., object-stored backups of volume data).

Users can instruct the elastic computing system 120 to create snapshots of their volumes stored on the block store servers 105. A snapshot can then be used to create a new volume with information matching the volume captured in the snapshot, for example providing the benefit of feeding the volume data to the new copy without impacting I/O operations at the primary and secondary replicas of the volume. Further, due to the greater redundancy of the object storage servers 110 provided in some embodiments, such snapshots may provide a more resilient backup copy of a volume than additional copies stored on the block store servers 105. Another benefit of using a snapshot to create a new volume copy is that it may provide the ability to replicate the volume across availability zones, while the block store servers 105 may only support replication within a given availability zone. However, as described herein the time required to transfer data from the object storage servers 110 to the block store servers 105 can be significantly greater than the time required to transfer that same data from one block store server 105 to another block store server 105.

In one embodiment, a snapshot is a point-in-time block-level backup of the volume, stored as a copy of data on the volume on one or more of the object storage servers 110 (e.g., as a single object or a collection of objects). However, unlike other data stored on the object storage servers 110, snapshots may not be accessible within user buckets, and instead are accessible through the application programming interface ("API") of the block store servers 105. In one example, snapshots are implemented as incremental records of data within a volume. Illustratively, when the first snapshot of a volume is taken, all blocks of the volume that contain valid data are copied as one or more objects to the object storage servers 110, and then a snapshot "table of contents" or "manifest" file is written to the object storage servers 110 that includes a record of the one or more objects, as well as the blocks of the volume to which each of the one or more objects correspond. Due to the use of incremental snapshots, when the subsequent snapshots are taken of the same volume, only the blocks that have changed since the first snapshot need by copied to the object storage servers 110, and the table of contents or manifest file can be updated to point to the latest versions of each data block (or a second table of contents or manifest file can be created, enabling the initial table of contents or manifest file to remain as a record of a prior version of the volume). An initial snapshot can be used to reconstruct the volume at the time of the initial snapshot, or snapshots from subsequent time points can be combined together or with the initial snapshot to reconstruct the entire volume at any individual subsequent point in time. In this way snapshots can serve as both incremental backups and a full backup of a given volume.

When creating a snapshot, any data written to the volume up to the time the snapshot is started can be included in the snapshot, and users can continue to perform I/O operations to their volumes during snapshot creation without affecting the snapshot. Users can create a new volume from a snapshot, for example to create duplicates of their volumes or to restore data. The new volume will contain all the data stored in the snapshot and thus will be a duplicate of the original volume at the time the snapshot was started. In this manner, snapshots can also be used to transfer a volume's data from one availability zone to another. Similarly, snapshots can be taken of computing resource instances (e.g., virtual processing resources) to create a "machine image" of that instance that is stored in the object storage servers 110, and new copies of the instance can be launched from the machine image. The disclosed techniques may be applied to hydrate target computing resource instances from a machine image, similar to the disclosed hydration of target volumes.

The acceleration pool servers 115 can be positioned within the elastic computing system 120 as an intermediary between the object storage servers 110 and the block store servers 105 for the disclosed new volume acceleration techniques. The acceleration pool servers 115, like the block store servers 105, also operate to store volumes of data, shown in FIG. 1A as source volumes 116. These source volumes 116 can also be stored using block storage, and may be built using snapshots from the object storage servers 110. However, unlike the target volumes 106, the source volumes 116 can be read-only. This can reserve the source volumes 116 for providing data to new target volumes by preventing them from being used for user I/O operations and from being attached to any computing instances. Pools of the source volumes 116 can be created from the same snapshot to support new volume replicas of the snapshot data as described herein, and then new user volumes can be created from the source volumes 116. Creating a new volume by copying the data of another volume (or a snapshot of that volume) onto computer memory designated for the new volume is referred to herein as "hydration." In some implementations the acceleration pool servers 115 can be a special purpose hardware pool for hosting the source volumes described herein. In other embodiments, the acceleration pool servers 115 can represent certain ones of the block store servers 105, or certain portions of the block store servers 105, that host the source volumes described herein.

Figure 1B:
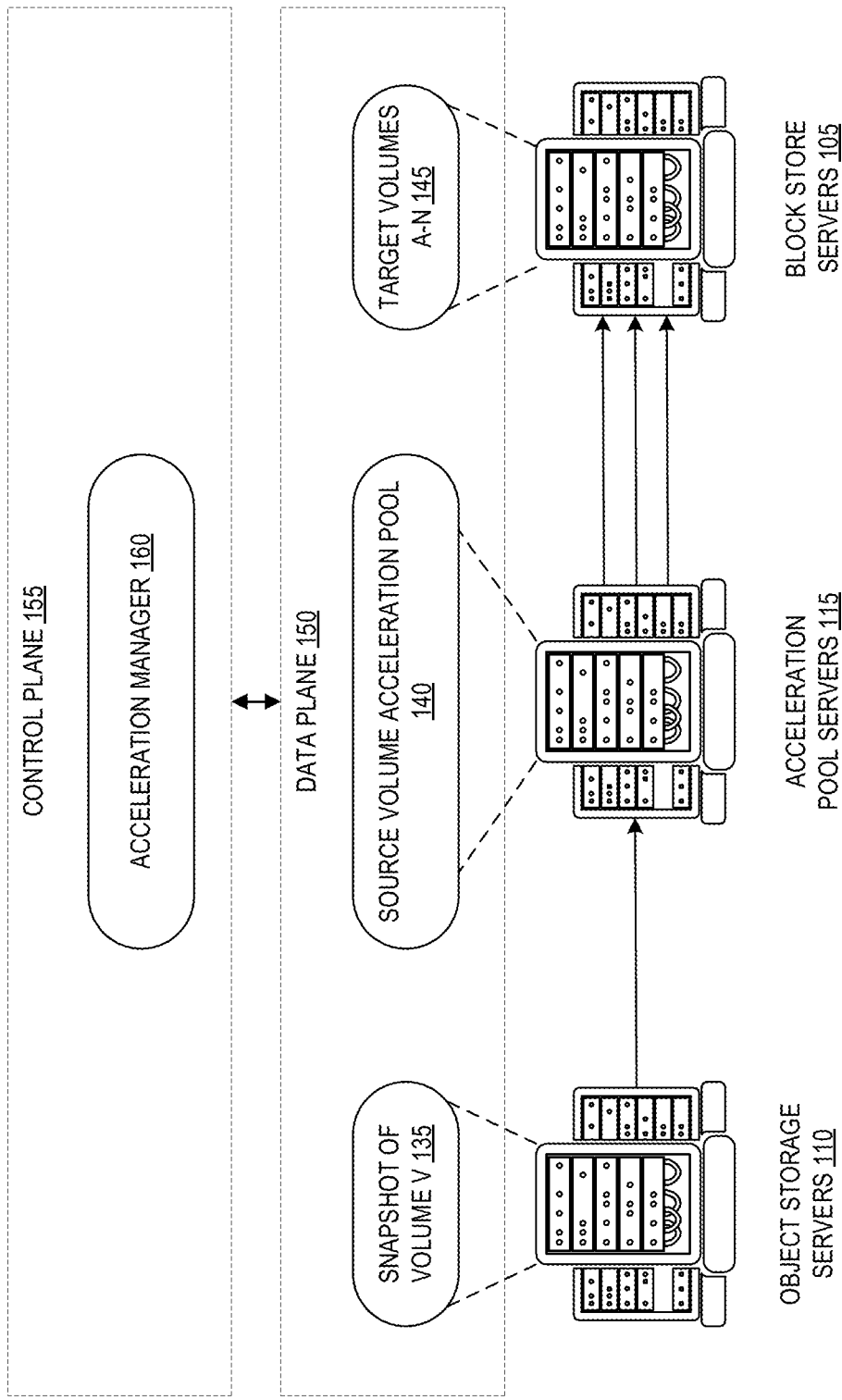
FIG. 1B depicts a schematic diagram of using a dedicated source volume pool to accelerate creation of target volumes from a snapshot within the elastic computing system of FIG. 1A, according to the present disclosure.

FIG. 1B depicts an example of how the object storage servers 110, acceleration pool servers 115, and block store servers 105 can be configured to transfer data for new volume acceleration, according to embodiments of the present disclosure. FIG. 1B also depicts a data plane 150 and a control plane 155 of the elastic computing system 120. The data plane 150 represents the movement of user data through the elastic computing system 120, while the control plane 155 represents the movement of control signals through the elastic computing system 120. One skilled in the art will appreciate that the data plane 150 and control plane 155 represent logical constructs related to the operation of servers 105, 110, 115, rather than a physical configuration of the servers 105, 110, 115.

The control plane 155 is a logical construct that can be implemented by at least one server with computer-executable software for coordinating system and user requests and propagating them to the appropriate servers in the elastic computing system 120. Functions of the control plane 155 can include, for example, replication of data, failover operations, and receiving requests from users for specific actions to be performed with respect to the data plane 150. These can include creating, cloning, and snapshotting volumes 106. Specifically, the control plane 155 implements an acceleration manager 160, which can be a software module implemented by one or more hardware processors (of the servers 105, 110, 115 or other control servers of the elastic computing system 120) to control the acceleration techniques described herein. The data plane 150 in the illustrated embodiment is implemented by execution of operations on the snapshot 135, source volume acceleration pool 140, and target volumes A-N 145. Though not illustrated, the block store servers 105 can also store the origin volume (the volume V initially used to seed the data of the snapshot 145).

As described above, the object storage servers 110 can store a snapshot of a particular volume, represented in FIG. 1B as the snapshot 135 of volume V. When the user (or a system protocol) requests to accelerate the hydration of new volumes copying the state of volume V as reflected in the snapshot, the acceleration manager 160 of the control plane 155 can coordinate providing the data of volume V from the snapshot 135 of the object storage servers 110 to the source volume acceleration pool 140 on the acceleration pool servers 115. The acceleration pool servers 115 can create a number of new volumes (referred to as "source volumes" 140 as an individual source volume is the source of the eventual target volume) and hydrate these source volumes with the data from the snapshot 135 of volume V. The acceleration pool servers 115 can also store mappings between particular requesting users and particular ones of the source volumes, as described in further detail below. The source volume acceleration pool 140 on the acceleration pool servers 115 can then be used to hydrate the target volumes A-N 145 on the block store servers 105. As such, the target volumes A-N 145 are copies of the state of volume V reflected in the snapshot 135. These target volumes A-N 145 are referred to herein as the "target volume" as they are the target of the replication process. The provisioning of the source volume and target volume can controlled by the control plane 155, as described in more detail below with respect to the volume acceleration workflows.

As described herein, hydrating target volumes from source volumes can result in significantly faster hydration compared to using a snapshot to directly hydrate the target volumes. For example, communications between the object storage servers 110 and the block store servers 105 can be passed through intermediary hardware such as a computing resource server that hosts processing instances, as described above. An example network path for establishing data transfer between the object storage servers 110 and the block store servers 105 can be as follows. A first computing instance can receive a request from a particular object storage server 110 to transfer data to a particular block store server 105. This first computing instance then sends the request along the computing instance network to a second computing instance. This second computing instance then sends the request to the particular block store server 105. As such, the network path can involve multiple hardware entities (the particular object storage server 110, the particular block store server 105, and the computing resource servers that host the first and second instances). In addition, the network connections between some or all of these hardware entities may use publicly accessible networks such as the Internet, as described above for purposes of fault isolation and redundant data concerns.

In contrast, communications between the acceleration pool servers 115 and the block store servers 105, which are both configured for block storage, can be governed by an elastic volume hydration protocol in which the hardware of the target volume directly requests blocks of data from the hardware of the source volumes. Compared to the server 110 to server 105 network path described above, the server 115 to server 105 network path involves fewer communications between fewer distinct hardware entities within the elastic computing system 120, which can contribute to the faster hydration time. In addition, as described above the block store servers 105 and the acceleration pool servers 115 (which can be a subset of the block store servers 105) can be connected to one another through private, low-latency links, for example fiber optic network cables. This can also contribute to the faster hydration time, in comparison to directly hydrating from the object storage servers 110.

Another benefit of the disclosed techniques relates to the minimum quantities of data that can be retrieved from the object storage servers 110 and the acceleration pool servers 115. In some implementations, the minimum quantity of data that can be transferred from the object storage servers 110 exceeds the I/O of a typical volume for a block request. As such, if a target volume requests a block of data from the object storage servers 110, the target volume may be provided with more data than required to fulfill the "get block" request. In contrast, because the acceleration pool servers 115 storing the source volumes and the block store servers 105 storing the target volume use the same block data storage structure, the acceleration pool servers 115 can answer a get block request with the precise quantity of data requested. This can reduce unnecessary network congestion compared to fetching the "extra" data from object storage.

Overview of Example User to Source Volume Mappings

Figure 2:
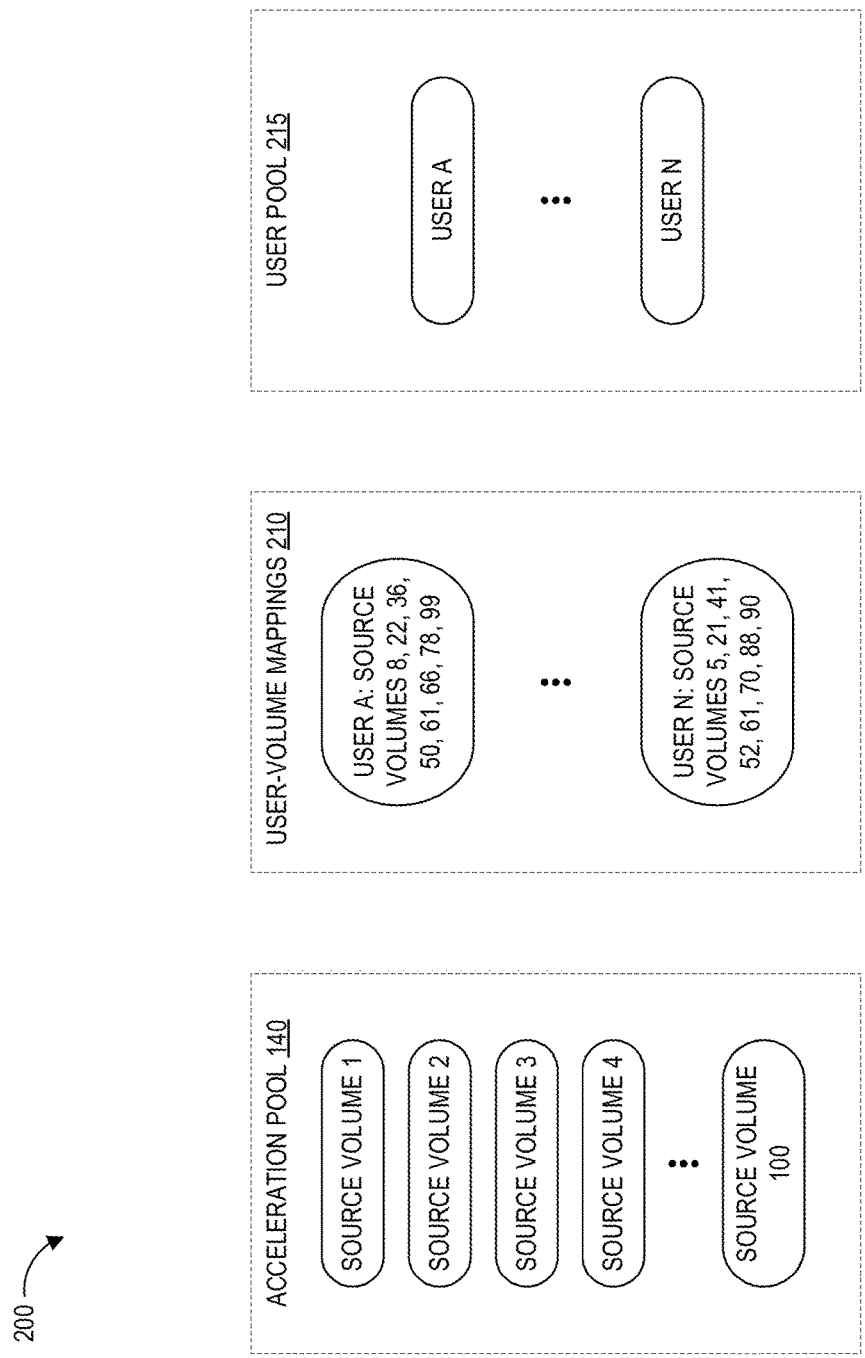
FIG. 2 depicts an example schematic diagram of a mapping between the source volume pool and users requesting the target volumes of FIG. 1B.

FIG. 2 depicts an example schematic diagram of a mapping between the source volume pool and users requesting the target volumes of FIG. 1B. FIG. 2 depicts an example of the source volume pool 140 that includes 100 source volumes. Various implementations of the disclosed techniques can create varying numbers of source volumes, depending for example upon account settings of the user who controls the snapshot, the quantity of data of the snapshot, the number of users that are expected to use the snapshot to hydrate new volumes, the number of users actually using the snapshot to hydrate new volumes, and the like.

FIG. 2 also depicts an example of user A and user N, possibly with additional users, who are accessing the source volume pool 140 for hydration of target volumes. Varying numbers of users can access the source volume pool 140 at a given time. The accelerated hydration techniques can map each user to a certain number of the source volumes in the source volume pool 140. In the depicted example, each user is mapped to eight of the source volumes, however this number can be increased or decreased in various implementations. These mapped source volumes represent the potential sources of hydration for target volumes created for that user.

These volumes can be randomly mapped to a given user, for example using shuffle sharding techniques and/or consistent hash rings. For example, the disclosed techniques can pick a defined hash and access an account ID of the user requesting the target volume hydration. The disclosed techniques can run the account ID through the hash and map the resulting value onto the pool to pick the first volume to assign to the user. For instance, some implementations can divide the final value of the hash by the number of volumes, take the remainder, and pick the volume in the pool with a volume ID corresponding to the remainder. To pick the next volume, the disclosed techniques can take the output of the first hash run, combine that with the account ID, and run that value through the hash a second time to get the second volume ID. This can be repeated as many times as needed to select the determined number of volumes to assign to the user. Other implementations can use other suitable "random" or pseudo-random distribution algorithms.

By randomly mapping a certain number of the source volumes to each user, the disclosed accelerated hydration techniques can mitigate the risk that any given user could overwhelm all of the data transmission bandwidth of the source volume pool 140 by having access to all of the source volumes 1-100. Instead, each user has a limited subset of the source volumes that can be used to support their target volume hydration. Due to the random assignment of a certain number of the source volumes to each user, the likelihood of two users sharing all of their assigned source volumes is low. Thus, if a particular user is using a large percentage of the hydration bandwidth of all of their assigned source volumes, it is likely that other users have access to available source volumes in the source volume pool 140.

To illustrate, in the depicted example user A is mapped to source volumes 8, 22, 36, 50, 61, 66, 78, and 99, and user N is mapped to source volumes 5, 21, 41, 52, 61, 70, 88, and 90. Consider that each source volume can support ten hydrations at a time (this number can increase or decrease for other implementations). In total, this would give the example source volume pool 140 (including one hundred source volumes) the ability to support 10,000 simultaneous hydrations. If user A is creating 80 or more target volumes, then each of volumes 8, 22, 36, 50, 61, 66, 78, and 99 may be unavailable for use by other users. However, user A would not be able to access other volumes in the source volume pool 140 to support hydrations, thus leaving these other source volumes available for other users. As such, if user N initiates creation of a target volume, then source volume 61 from their pool would be unavailable as it is shared with user A. However, user N also has seven other volumes that can support their target volume hydration. As such, the user-volume mapping techniques beneficially increase the availability of the source volume pool 140 across its user base, due to (1) the low chance of two users sharing their entire assigned subset of source volumes, and (2) the low likelihood of each source volume in user N's assigned subset also being assigned to another user that is using its entire bandwidth.

Overview of Example Target Volume Hydration Acceleration

Figure 3A:
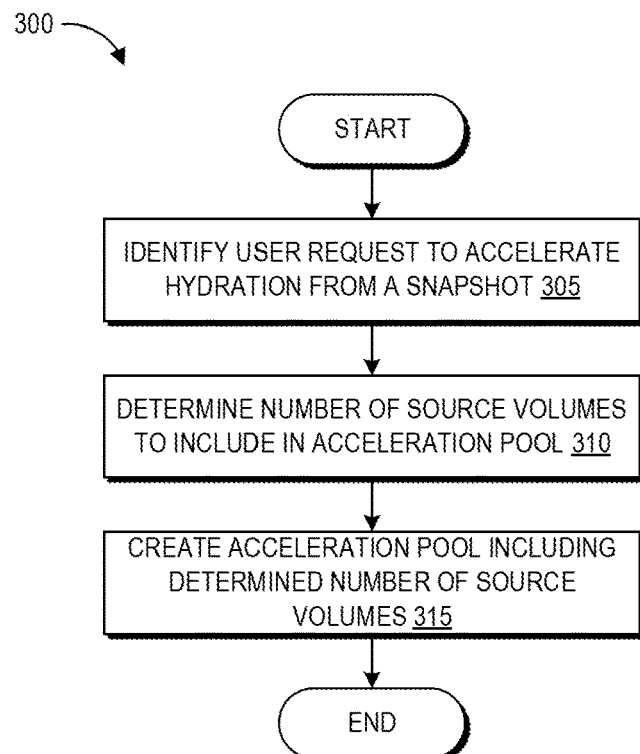
FIG. 3A is a flowchart of an example process for creating an acceleration pool within the elastic computing system of FIG. 1A.

FIG. 3A is a flowchart of an example process 300 for creating an acceleration pool within the elastic computing system 120. The process 300 can be implemented by the object storage servers 110, acceleration pool servers 115, and acceleration manager 160 of the control plane 155, according to some embodiments.

At block 305, the acceleration manager 160 can identify a user request to accelerate hydration from a particular snapshot. As described above, users may be charged for their usage of resources within the elastic computing system 120, and thus the creation of an acceleration pool may result in additional costs to the user. For example, the operator of the elastic computing system 120 can run a web server that exposes one or more application program interfaces (APIs) to a network, such as the Internet. An API can be associated with one or more uniform resource locators (URLs) for different operations the API can perform. In this example embodiment, the operator can expose a URL for accelerating creation of volumes from snapshots that can take input parameters such as an identifier of the user, an identifier of the snapshot and/or volume to accelerate, how many source volumes to add to the acceleration pool, how fast to accelerate creation of volumes, or similar parameters. As such, in some implementations the disclosed hydration acceleration techniques can be made available to users of the elastic computing system 120 on an opt-in basis. However, in other examples the disclosed hydration acceleration techniques may be provided to users of the elastic computing system 120 without additional charge, for example as a back-end service that may not be exposed or visible to users. In such implementations, block 305 may instead involve identifying the particular snapshot as a candidate for accelerated hydration, for example based on past hydration statistics for other snapshots belonging to the same user as the particular snapshot that indicate more than a threshold number of other users typically hydrate target volumes from the snapshot user's snapshots.

At block 310, the acceleration manager 160 can determine a number of source volumes to include in an acceleration pool for the particular snapshot. In some implementations, this can be a user-specified number. In such implementations, the number of source volumes in the pool may remain static regardless of actual usage of the source volumes. In some implementations, the number of source volumes to include in the acceleration pool can be programmatically determined, for example based on the past hydration statistics. In such implementations, the number of source volumes in the pool may by dynamically increased or decreased based on the actual usage of the source volumes. If the user is charged for usage of the computing resources related to the acceleration pool, such implementations may require authorization from the user before additional source volumes are added to the acceleration pool. For example, the user can be sent an alert that usage of their acceleration pool has reached or exceeded some predetermined threshold, together with a request to add a certain number (programmatically-identified or user-specified) of additional source volumes. In some implementations the number of source volumes to include in the acceleration pool can be determined based on both user-specified source volume limits and past hydration statistics. For example, via an API, a user can specify a maximum number of source volumes that can be created for any of the user's snapshots or for this particular snapshot. The acceleration manager 160 may analyze the past hydration statistics to determine a starting number of source volumes that would support the typical hydration usage from this user's snapshots, and may increase (or decrease) the number of source volumes up to the user-specified maximum based on analyzing usage of the acceleration pool.

At block 315, the acceleration manager 160 can create the acceleration pool to include the determined number of source volumes. For example, the acceleration manager 160 can identify available memory of the acceleration pool servers 115 and configure this memory with partitions according to the partitions of the origin volume used to generate the snapshot. The acceleration manager 160 can then cause the data of the snapshot stored on the object storage servers 110 to be transmitted to this configured memory of the acceleration pool servers 115 in order to hydrate the determined number of source volumes.

In some implementations, the acceleration manager 160 can notify the user to whom the snapshot belongs of the progress of hydration of their source volumes. For example, the user can initially be presented with a user interface that indicates the system is "optimizing" their snapshot hydration (or a similar notification conveying the same message) or the status can be made available via an API response. Once a certain threshold number or percentage of source volumes have fully hydrated, or once a certain quantity or percentage of the overall acceleration pool data has been hydrated, this notification can switch to indicate to the user that their snapshot hydration is "accelerated" (or a similar notification conveying the same message).

Figure 3B:
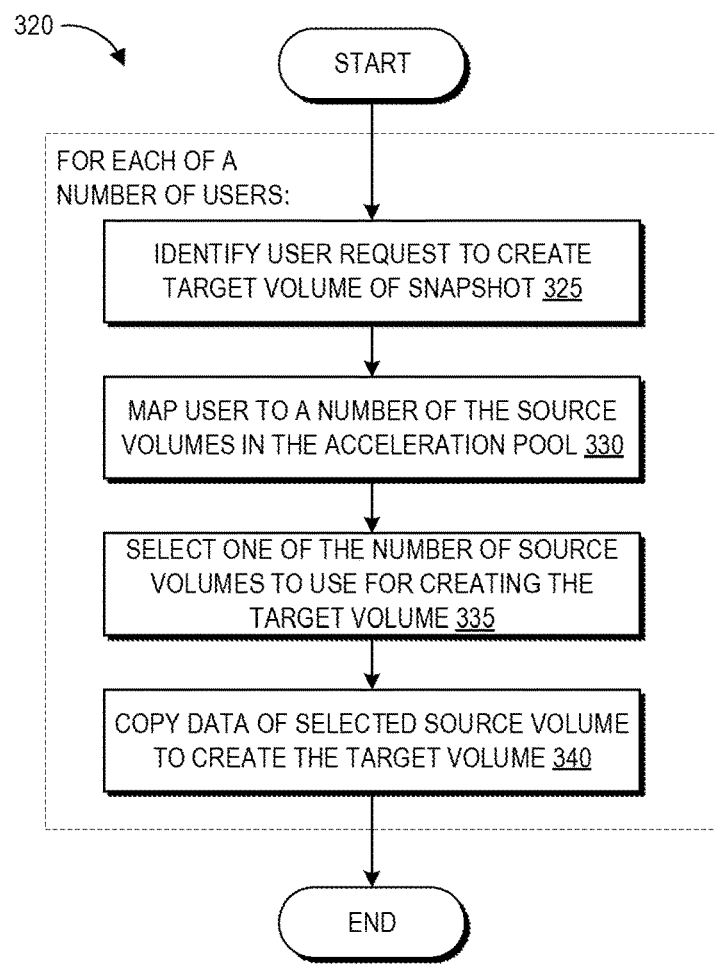
FIG. 3B is a flowchart of an example process for using an acceleration pool, created for example according to the process depicted FIG. 3A, to support creation of target volumes of data.

FIG. 3B is a flowchart of an example process 320 for using an acceleration pool, created according to the process 300 or another suitable process, to support creation of target volumes of data. The process 320 can be implemented by the acceleration pool servers 115, block store servers 105, and acceleration manager 160 of the control plane 155, according to some embodiments.

In some embodiments, the target volume hydration process 320 may be implemented while the source volume hydration process 300 is ongoing. For example, the source volumes may hydrate from the snapshot in the same order in which they will hydrate target volumes, and thus a given source volume can begin use for target volume hydration even before it itself has become fully hydrated with the origin volume data.

At block 325, the acceleration manager 160 can identify a user request to create a target volume from the snapshot. For example, a user can request to hydrate a new volume with the data of the data of the snapshot via an API request, and the acceleration manager 160 can identify that this particular snapshot is set up for accelerated hydration.

At block 330, the acceleration manager 160 can map the user to a predetermined number of the source volumes in the acceleration pool, as described above with respect to FIG. 2. If the user has already requested a previous target volume hydration from the acceleration pool, the acceleration manager 160 can use a previously-generated mapping between that user and the source volumes in order to maintain consistency and the availability advantages of the mapping described above.

At block 335, the acceleration manager 160 can select one of the number of source volumes to user for creating the target volume. For example, the acceleration manager 160 can analyze metrics relating to each source volume in the pool to generate a score for each source volume, and can select the source volume with the best score. Further details of this source volume selection process are described below with respect to FIGS. 5 and 6.

At block 340, the acceleration manager 160 can control the copying of blocks of data from the memory hosting the selected source volume to the memory configured for hosing the target volume. Additional details of an example of the target volume hydration process are described with respect to the data interactions of FIG. 4.

Figure 4:
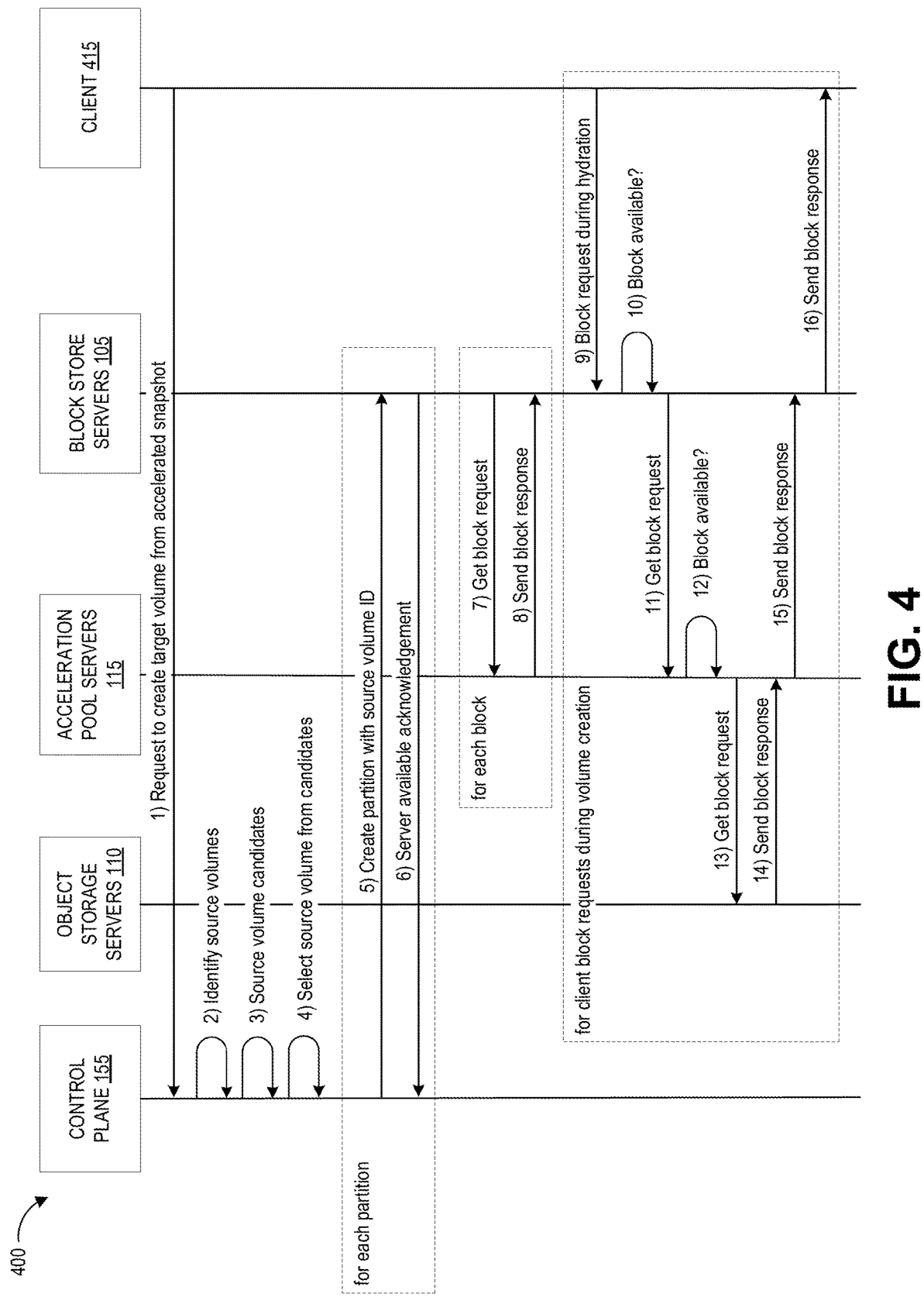
FIG. 4 is a schematic diagram of example interactions that can occur during the process of FIG. 3B.

FIG. 4 is a schematic diagram of example interactions 400 that can occur during the target volume hydration process 320. FIG. 4 depicts data communications between the acceleration manager 160, object storage servers 110, acceleration pool servers 115, block store servers 105, and optionally the client 415. The client 415 can represent a computing device of the user requesting the target volume, or an API of the block store servers 105 that provides the user with access to the block store servers 105.

With continued reference to FIG. 4, illustrative interactions 400 are depicted for initiating hydration of a target volume from a selected source volume of a dedicated acceleration pool. The interactions of FIG. 4 begin at (1), where the client 415 submits a create volume request to the control plane 155. Some or all of the actions of the control plane 155 can be executed by the acceleration manager 160. In response to the request, at (2) the control plane 155 determines information regarding the source volumes for the snapshot, and at (3) the control plane 155 determines a subset of source volume candidates associated with this request. If no subset has yet been assigned to the requesting user, at (3) the control plane 155 may assign the user with a subset as described above with respect to FIG. 2. In some embodiments, this assignment information may be maintained by the control plane 155, and thus for a user that has previously requested to hydrate from this particular acceleration pool, the source volume candidate information can include the assigned subset of source volumes in the acceleration pool.

At (4) the control plane 155 selects a source volume to use for this request, for example are described below with respect to FIGS. 5 and 6. Next, at interactions (5) and (6) the control plane 155 configures the hardware of one or more block store servers 105 for the target volume. As illustrated by the dashed box labeled "for each partition," interactions (5) and (6) are performed for each partition of the volume, iteratively or in parallel. As described above, volumes may be partitioned a number of times, for example up to 16. At (5), the control plane 155 creates the partition on one of the block store servers 105. This partition stores the source volume ID corresponding to the partition. At (6), the block store server 105 sends a server available acknowledgement back to the control plane 155 to indicate that it has successfully stored the source volume ID.

After sending the source volume ID to the block store server(s) 105, the control plane 155 initiates target volume hydration, which involves the remaining interactions (7) through (16). As illustrated by the dashed box labeled "for each block," interactions (7) and (8) are performed for each block of the volume, iteratively or in parallel. When the block store server 105 is asked to create the target volume, it can be told to fetch data from the acceleration pool server 115. Thus, at (7) the block store server 105 sends a get block request to the acceleration pool server 115, and at (8) the acceleration pool server 115 responds with a send block response that provides the block store server 105 with the data of the requested block. Typically, data replication between block store servers may involve the source volume actively managing the blocks that are sent to a single, designated target volume. However, in order to allow the source volumes described herein to simultaneously hydrate multiple target volumes, the disclosed techniques allow the target volume to manage the blocks that are requested. Although interactions (7) and (8) are shown as performed between the block store servers 105 and the acceleration pool servers 115, in some implementations certain types of requests may be sent directly to the object storage servers 110. For example, standard hydration (e.g., not occurring in response to a get fault as discussed below) may be directed to the object storage servers 110. In addition, though the depicted interactions of FIG. 4 show the block store servers 105 "pulling" data (e.g., actively sending get block requests), other implementations may instead "push" data from the source to the block store servers 105.

Interactions (9) through (16) may only occur if the client 415 requests a block of the volume during hydration, and as described below only some of interactions (9) through (16) may occur in response to the block request. At (9), the client 415 submits a block request while the target volume is still hydrating from the source volume. For example, the user of the target volume may interact with the target volume in some way (e.g., reading or writing data) that requires the particular block of data. In response, at (10) the block store server(s) 105 can check whether that particular block is available. If so, the block store server(s) 105 can implement (16) to send the requested block to the client 415.

However, if the requested block is not available, this can trigger a get fault. In response to the get fault, at (11) the block store server(s) 105 send a get block request to the acceleration pool server(s) 115 in order to fetch the block from the acceleration pool server(s) 115. As described above, the interactions 400 can occur while the source volume is still in the process of hydration from the snapshot. As such, the source volume may have a flag or other data indication that can be set to indicate whether or not the source volume has completed its hydration. If so, the acceleration pool server(s) 115 can implement (15) to send the block to the block store server(s), which in turn implement (16) to send the requested block to the client 415.

If the source volume has not completed hydration, at (12) the acceleration pool server(s) 115 can check whether that particular block is available. If so, the acceleration pool server(s) 115 can implement (15) to send the block to the block store server(s), which in turn implement (16) to send the requested block to the client 415, similar to the interactions that occur when the source volume is fully hydrated. However, if the block is not yet available in the source volume, this can trigger an additional get fault. In response to the additional get fault, at (13) the acceleration pool server(s) 115 send a get block request to the object storage servers 110 to fetch the block from the source snapshot. At (14) the object storage servers send the data of the requested block the acceleration pool server(s) 115, which in turn implement (15) to send the block to the block store server(s), which in turn implement (16) to send the requested block to the client 415. It will be appreciated that (14) can also involve the conversion of an object-storage representation of the data of the block into a block-storage representation of the data of the block.

Thus, as illustrated by interactions (9) through (16), because the source and target volumes can be hydrating in parallel, the target volume hydration process may encounter a "double get fault" scenario in which the client requests a block that is not available in either of the target or source volumes, necessitating a fetch of the data of that block from the object storage servers 110. Thus, in some scenarios the target volume hydration process can involve on-demand fetching certain requested blocks of data from the object storage servers, when such requested blocks are both requested by the client and not available in the source volume.

Overview of Example Source Volume Selection

Figure 5:
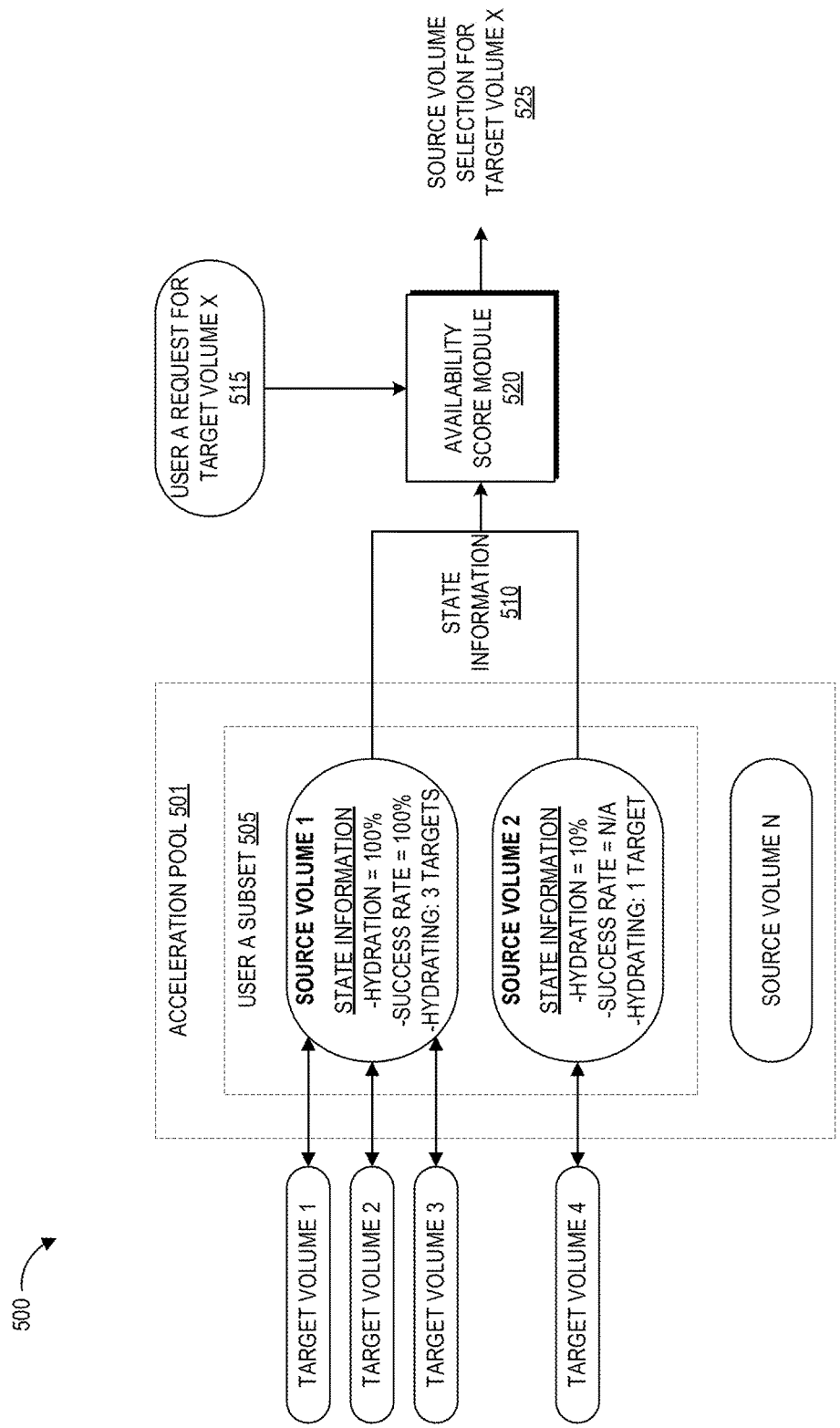
FIG. 5 is a schematic diagram of techniques for using state information to select a particular source volume to support creation of a given target volume.

FIG. 5 is a schematic diagram of a system 500 for using state information to select a particular source volume to support creation of a given target volume. The depicted components of the system 500 can be implemented on the block store servers 105, acceleration pool servers 115, and/or the control plane 155. Specifically, the target volumes 1-4 can be stored on one or more block store servers 105, the acceleration pool 501 can be stored on one or more acceleration pool servers 115, and data representing the user A subset 505 and the state information 510 can be maintained in a memory of one or both of the acceleration pool servers 115 and a computing device implementing the control plane 155. The availability score module 520 can be a software module that configures a processor of the computing device implementing the control plane 155 to perform the described source volume selection, and may be a component of the acceleration manager 160.

Each source volume in the acceleration pool 501 can have associated state information representing various availability parameters of the source volume. Example availability parameters include hydration status (e.g., fully hydrated or percentage hydrated) and how many target volumes the source volume is hydrating. Some implementations may consider additional availability parameters such as success rate (which refers to the percentage of target volumes that successfully complete hydration from the source volume), properties of the hardware storing the source volume, and hydration speed to a given requested target volume. With respect to the storage hardware, certain block store servers 105 may include solid state storage drives, which may be optimized for input/output operations per second (TOPS). Other block store servers 105 may include magnetic storage drives, which may be optimized for throughput rather than IOPS, for supporting frequently accessed data. The storage hardware type may be a factor in scoring the availability of a given source volume. With respect to hydration speed, the availability score module 520 can determine the network locations of the hardware configured to store the source volume and the target volume, the type and speed of the network(s) connecting that hardware, as well as the hardware platform type of one or both volumes, to estimate the hydration speed from the source volume to the target volume. Specifically, a network can be sub-divided into a number of "spines," with higher availability scores assigned to source and target volumes on the same spine, as cross-spine communications can cause more network congestion. Another availability parameter that may be considered in some implementations is how busy the computing device hosting the source volume is with other tasks that affect its I/O bandwidth (e.g., the overall load on the host device). Another factor that can be used as an availability parameter can be the number of IOPS allocated to existing target volume hydrations (e.g., if the target volumes being hydrated by a given source volume have high IOPS, then that source volume will run out of TOPS faster than another source volume hydrating the same number of target volumes that have lower IOPS). Yet another factor can be the percentage hydration of the currently hydrating target volumes.

As described herein, source and target volumes may hydrate blocks in the same order. In some implementations, the object storage servers 110 may sort object representations of the volume blocks in order of the most requested chunks of data, and the blocks may hydrate in a corresponding order. In some scenarios, there can be one or more common access patterns to the blocks of a given volume. For example, blocks corresponding to boot-up instructions and the operating system of a volume may be accessed first. From there, certain data may typically be accessed first, by all users or a subset of users of the volume. In such scenarios, the source volumes may hydrate from the snapshot, and the target volumes may hydrate from the source volumes, by receiving data in an order corresponding to the block access pattern. If there are multiple access patterns and the access pattern for the target volume is known or predicted to correspond to a particular access pattern, the access pattern used to determine block hydration order for a given source volume may be a relevant parameter to consider for its availability score with respect to a given target volume. Because block access pattern, network parameters, and other availability parameters can depend at least partly on parameters of the target volume, in some implementations the availability score of a particular source volume may differ with respect to different target volumes.

This state information 510 is provided to the availability score module 520. As illustrated, the availability score module 520 also receives information about a request from user A to create target volume X. This information enables the availability score module 520 to know which subset of the acceleration pool 501 to consider for user A, here shown as user A subset 505. The user A subset 505 includes source volume 1 and source volume 2, but not source volume N. Accordingly, to respond to user A's request, the availability score module 520 can consider source volumes 1 and 2, but not source volume N that is not part of the user A subset 505.

The availability score module 520 can compute a separate score for each volume as a weighted combination of its availability parameters. Some parameters may be positive, for example the hydration percentage, while others may be negative, for example the number of volumes hydrated. Various implementations can learn or assign appropriate weights and signs (+/−) to each availability parameter to generate an availability score representing the likelihood that a given source volume can hydrate a given target volume within a desired timeframe. Some availability parameters may have value options that are entirely determinative of the overall availability score of a volume. For example, if a source volume can simultaneously hydrate a maximum of 10 target volumes, and a given source volume is currently hydrating 10 target volumes, this means that the source volume is entirely unavailable, regardless of the values of its other availability parameters. As such, the availability score module 520 can be configured to recognize a value of 10 for the number of volumes hydrating and to set the availability score for that source volume to the lowest score, or to another value that indicates it is not available for consideration.

To illustrate, in this example the availability score module 520 receives the state information 510 representing the states of source volumes 1 and 2, as well as any information about target volume X (e.g., hardware platform and network location) to compute their availability scores. In this example, the availability score module 520 can calculate a first availability score for source volume 1 based on its full hydration (hydration=100%), 100% success rate, and that it is hydrating 3 targets. The availability score module 520 can calculate a second availability score for source volume 2 based on its partial hydration (hydration=10%), unknown success rate, and that it is hydrating 1 target. The availability score module 520 can compare these scores and, based on the comparison, make a selection 525 of one of the source volumes in the user A subset 505 to hydrate target volume X. This selection 525 can be provided to the control plane 155 for orchestrating the hydration, for example according to the interactions shown in FIG. 4.

In some implementations, a higher availability score can represent a higher likelihood that a given source volume can hydrate a given target volume within a desired timeframe (e.g., higher score=higher availability). In other implementations, a lower score can represent a higher likelihood that a given source volume can hydrate a given target volume within a desired timeframe (e.g., lower score=less usage/restrictions and thus higher availability). Further, the weights assigned to the various availability parameters can be adjusted to reflect a prioritization of certain parameters that are more highly correlated with successful hydrations. These weights may be defined by an engineer of the system 500, or can be learned using statistical modeling of past hydration data.

Specifically, the scoring equation can include a term for each availability parameter as well as a weight or coefficient that is multiplied by the respective availability parameter. The resulting score can be the sum of these weighted parameters. In some implementations, the values of these weights can be calculated, for example using linear regression or some other machine learning model, in order to correspond to logged hydration data. For example, the elastic computing system can run a number of hydrations, track the performance of these hydrations, and then calculate what should have been optimal coefficients of the availability equation based on optimizing the past hydrations. The "optimal" coefficients can be computed to achieve specific performance goals, including speed of hydration, reliability (e.g., likelihood of success) of hydrations, or computing resource usage (or some combination of these or other performance goals).

Figure 6:
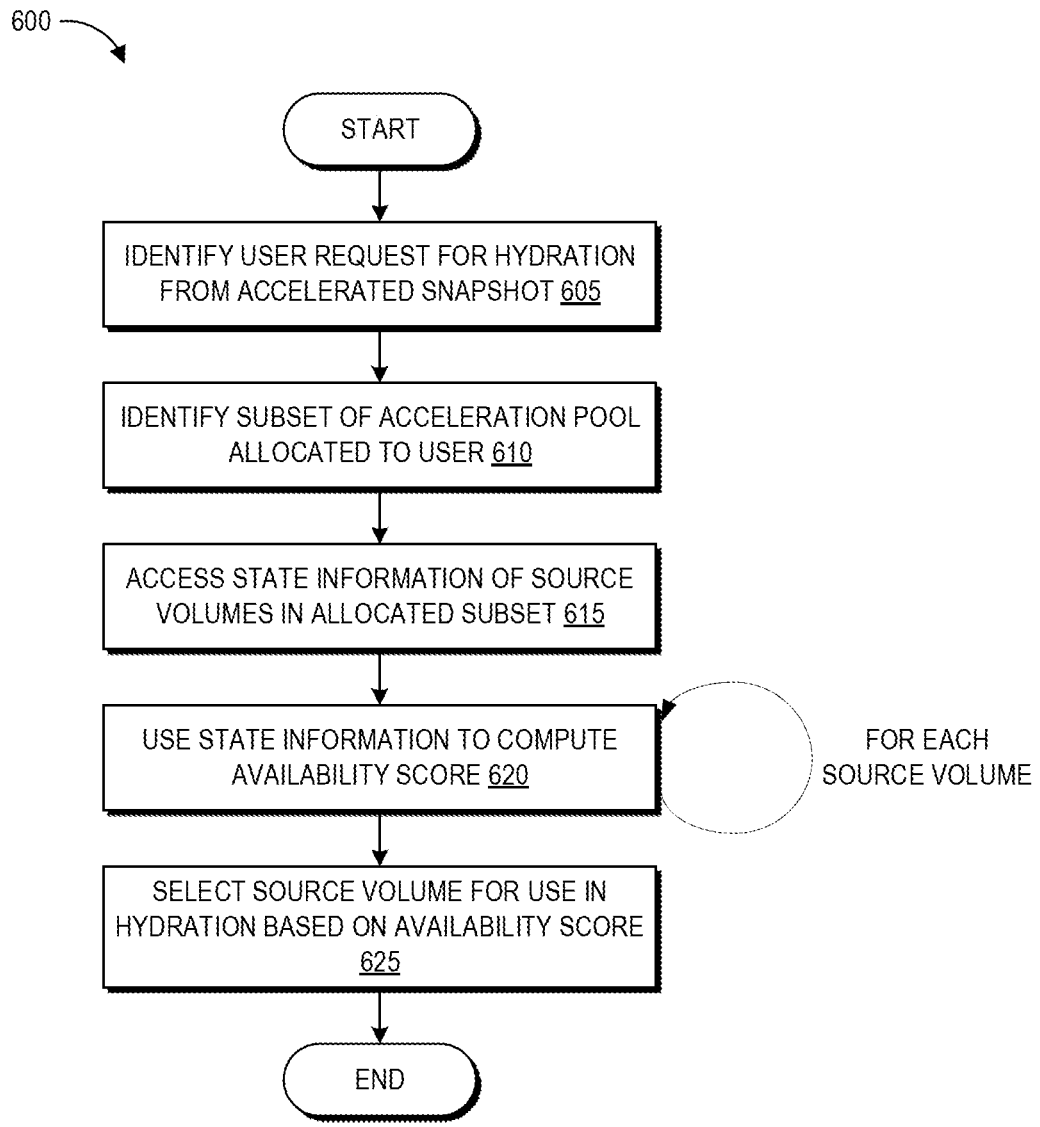
FIG. 6 is a flowchart of an example process for implementing the source volume selection techniques of FIG. 5, for example during the process of FIG. 3B.

FIG. 6 is a flowchart of an example process 500 for implementing the source volume selection techniques depicted in FIG. 5, for example during block 335 of the process 320 of FIG. 3B. The process 600 can be implemented at least in part by the availability score module 520.

At block 605, the availability score module 520 can identify a user request for hydration from an accelerated snapshot (e.g., a snapshot that has been selected by its controlling user or the elastic computing system 120 for the disclosed acceleration scheme).

At block 610, the availability score module 520 can identify the acceleration pool of source volumes associated with the accelerated snapshot, and can identify a subset of that pool that have been allocated to the user requesting the hydration. As described above, limiting users to different subsets of the acceleration pool, where those subsets are unlikely to be entirely overlapping between users, can help maintain the availability of the pool to a wide user base even if one or a few users are heavily using the pool.

At block 615, the availability score module 520 can access state information of the source volumes in the subset of the acceleration pool allocated to the user. As described above, this state information can include various availability parameters such as the hydration status/percentage of a source volume, hydration success rate of the source volume, number of targets currently being hydrated by the source volume, properties of the computer hardware storing the source volume, network properties, to name a few examples.

The availability score module 520 can access state information for each of the source volumes in the user-assigned availability pool subset.

At block 620, the availability score module 520 can use the state information corresponding to a particular source volume to compute the availability score of that source volume, for example as a weighted sum of the different availability parameters. As indicated by the loop depicted in FIG. 6, block 620 can be repeated for each source volume in the subset of the acceleration pool allocated to the user, in order to generate an availability score for each source volume in the subset.

At block 625, the availability score module 520 can use the generated availability scores in order to select one of the source volumes for use in hydration. The selected source volume can be identified to the control plane 155 and used to hydrate the requested target volume, for example via the example interactions depicted in FIG. 4.

Although not illustrated, in some implementations blocks 615-625 can be repeated periodically or intermittently as the hydration of the target volume is still occurring. If another source volume has a better availability score than the previously selected source volume, the availability score module 520 may indicate to the control plane 155 that the hydration should be switched to this other source volume. This can involve confirming that the other source volume has been hydrated from the snapshot to the extent necessary to continue the current target volume hydration. For instance, as described above the source volumes and target volumes can receive blocks of data of the volume in the same order, and a particular source volume may hydrate from the snapshot in parallel with another source volume hydrating a target volume. If the hydration of the target volume is switched to the particular source volume that is itself still hydrating, the availability score module 520 can confirm that the next block that the target volume will request has already been copied into the particular source volume.

Overview of Example User Interfaces

Figure 7A:
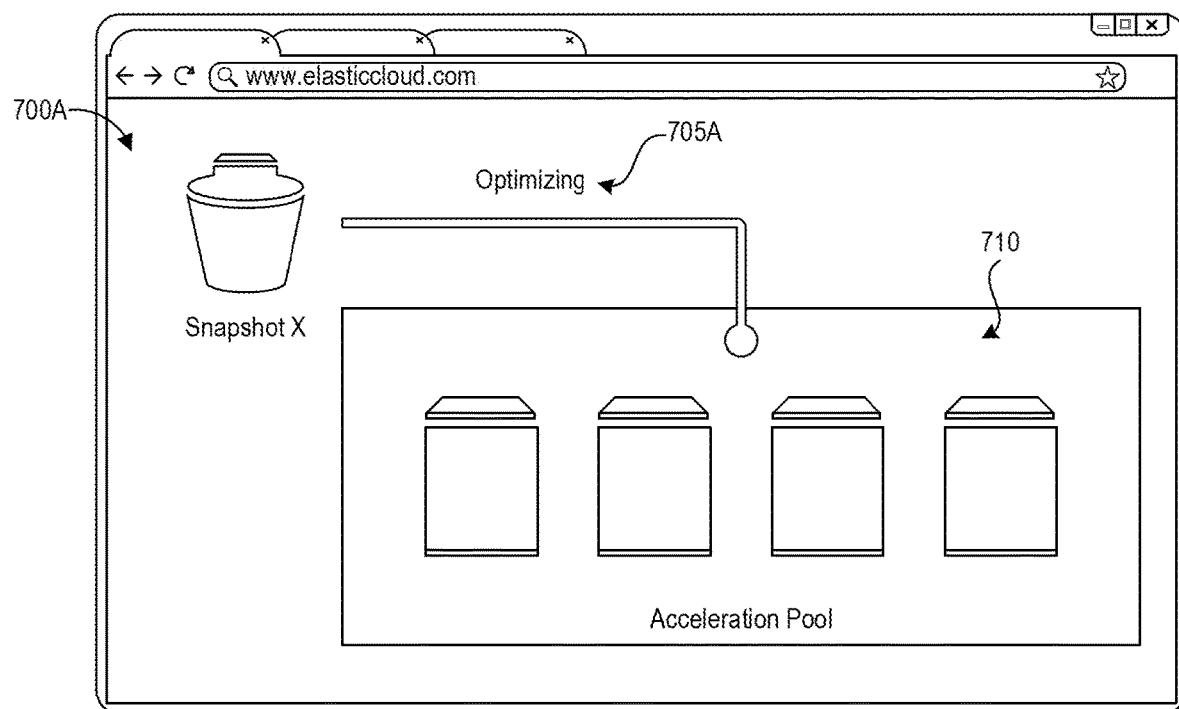
FIGS. 7A and 7B depict example user interfaces for displaying status indications relating to an acceleration pool, created for example according to the process depicted FIG. 3A.
Figure 7B:
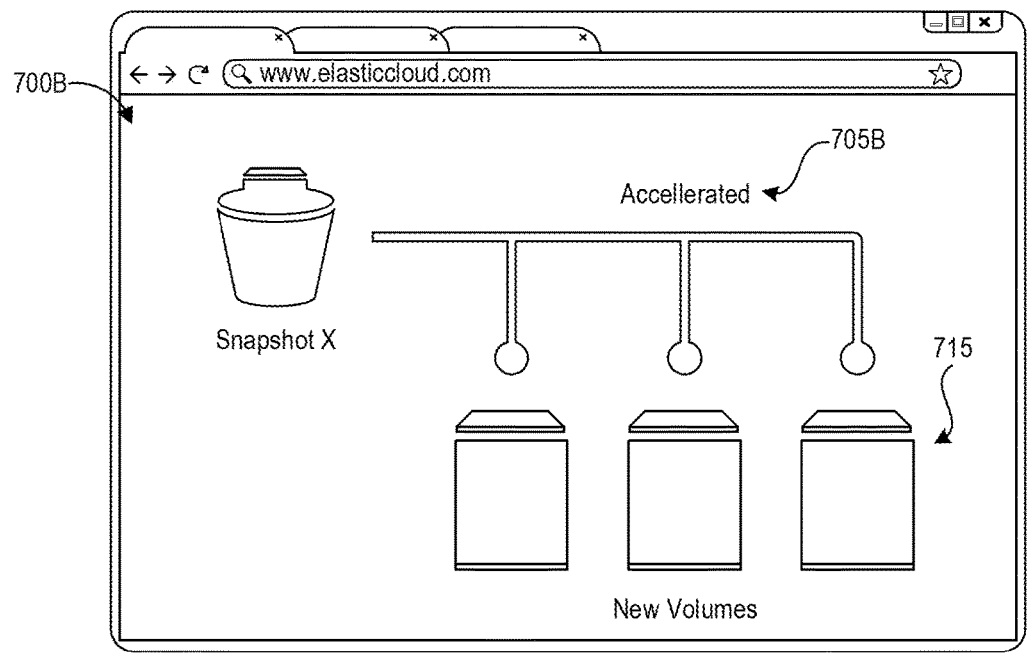

FIGS. 7A and 7B depict example user interfaces for displaying status indications relating to an acceleration pool, created for example according to the process depicted FIG. 3A. It may be desired to provide a user interface that provides an acceleration status to the user who created the snapshot, or to others users accessing the snapshot.

FIG. 7A depicts an example user interface 700A for providing acceleration status to the user who created the snapshot, depicted in FIGS. 7A and 7B as "snapshot X." The user interface 700A graphically depicts the provision of volume data from snapshot X to the acceleration pool 710. The user interface 700A also provides a first status indication 705A to the user indicating that the snapshot acceleration process is "optimizing." Similar terminology may be used in other implementations to convey the same meaning—that the creation of the acceleration pool has begun, but has not yet completed to a point that would be considered as full acceleration.

The example user interface 700A includes a graphical depiction of volumes in the acceleration pool. In some implementations, the snapshot X user can be provided with a visual depiction of the hydration status of each volume in the acceleration pool, for example based on an increasing fill level of some color or pattern on the graphical source volume representations. Further, the snapshot X user may be presented with textual or graphical information about the state of these source volumes. In other implementations, the snapshot X user may instead be presented with a general status of the overall pool, for example a percentage of total pool hydration, or the first status indication 705A or the fully accelerated status indication. In some implementations, the snapshot X user may not be shown any representation of the acceleration pool or provided any indication that the system is creating/has created the acceleration pool, and can instead merely be informed about the status of their snapshot acceleration request.

FIG. 7B depicts a second example user interface 700B that may be shown to a different user requesting hydration of a target volume from snapshot X. The user interface 700B graphically depicts the provision of volume data from snapshot X to the new target volumes 715. The user interface 700B also provides a second status indication 705B to the user indicating that the snapshot acceleration process is "accelerated." Similar terminology may be used in other implementations to convey the same meaning—that the creation of the acceleration pool has completed to a point that would be considered as full acceleration. It will be appreciated that the user interface 700A can be modified to include the second status indication 705B, and the user interface 700B can be modified to include the first status indication 705A, based upon the status of the acceleration pool.

Users who are not the creator of snapshot X may not be presented any information specifically addressing the existence of the acceleration pool, as shown in FIG. 7B. Instead, they may be presented with the overall status of the snapshot acceleration process. This can be beneficial with respect to preventing overload of the acceleration pool. For example, if a user wishes to create a new target volume from snapshot X but sees that the snapshot is not yet accelerated, they may delay their target volume creation request, thereby avoiding a strain on the in-progress acceleration pool.

In some implementations, the first status indication 705A can be displayed until all source volumes have fully hydrated. In other implementations, the first status indication 705A can be displayed until some threshold number of source volumes have fully hydrated, or until some threshold number of source volumes have hydrated above a threshold percentage. Some implementations may look at a combination of some number of fully hydrated source volumes combined with some number of other source volumes each hydrated to a certain threshold percentage, for example 3 completely hydrated and four hydrated to 25% or greater. The standard for switching from the first status indication 705 to the second status indication 705B can be determined, for example, based on probabilistic statistical modeling. The standard can be set to balance the desired to show the full acceleration status as quickly as possible with the chance that this could overload the capacity of the acceleration pool and deliver a slower hydration than expected by a user.

As described above, in some implementations additional source volumes can be added to the acceleration pool, for example in response to high demand for target volumes hydrated from snapshot X. In such circumstances, the hydration of these additional source volumes may cause a change from the second status indication 705B back to the first indication 705A. In addition, in some embodiments a "low availability" status indication may be displayed if the state information for the source volumes indicates that some threshold number or percentage of the source volumes are not available (or are minimally available).

Terminology

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

The processes 210, 255 may begin in response to an event, such as on a predetermined or dynamically determined schedule, on demand when initiated by a user or system administer, or in response to some other event. When the process 210, 255 is initiated, a set of executable program instructions stored on one or more non-transitory computer-readable media (e.g., hard drive, flash memory, removable media, etc.) may be loaded into memory (e.g., RAM) of a server or other computing device. The executable instructions may then be executed by a hardware-based computer processor of the computing device. In some embodiments, the process 210, 255 or portions thereof may be implemented on multiple computing devices and/or multiple processors, serially or in parallel.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. All changes which come within the meaning and range of equivalency of the claims are to be embraced within their scope.

What is claimed is:

1. A computer-implemented method, comprising:
   receiving a request from a user to create a volume;
   identifying that the volume is configured for accelerated creation of volumes;
   accessing an acceleration pool including a plurality of source volumes, wherein each source volume in the plurality comprises a block representation of at least a portion of data for creating the volume;
   computing availability scores for at least some of the plurality of source volumes, wherein an availability score for a particular source volume is computed based on a state of the particular source volume to provide data to the volume, and wherein computing the availability score for the particular source volume comprises:
   determining a first value of a first availability parameter, wherein the first availability parameter is a percentage of the data of the volume that has been copied to the particular source volume from an object representation; and
   computing the availability score for the particular source volume based at least partly on the first value;
   selecting, from the acceleration pool, at least one source volume to use for creating the volume, wherein the selecting is based at least partly on the availability scores; and
   wherein creating the volume comprises sending blocks of data from the at least one source volume to the volume.

2. The computer-implemented method of claim 1, further comprising handling user reads from and writes to the volume.

3. The computer-implemented method of claim 1, further comprising:
   selecting a particular subset of the acceleration pool to use for creating the volume; and
   computing availability scores for the particular subset of the acceleration pool to identify a particular source volume to use for creating the volume.

4. The computer-implemented method of claim 3, further comprising:
   selecting a different particular subset of the acceleration pool to create an additional volume; and
   computing additional availability scores for the different particular subset of the acceleration pool to identify a particular source volume for handling the additional request.

5. The computer-implemented method of claim 1, further comprising computing the availability score for the particular source volume as a weighted sum of a plurality of availability parameters including the first availability parameter.

6. The computer-implemented method of claim 5, wherein one of the plurality of availability parameters is a type of hardware used to store a source volume, the computer-implemented method further comprising:
   determining the type of hardware used to store the particular source volume; and
   wherein the availability score for the particular source volume is further computed based at least partly on the type of hardware.

7. The computer-implemented method of claim 1, further comprising handling the request to create the volume before creation of at least some of the plurality of source volumes is completed.

8. Non-transitory computer-readable media comprising computer-executable instructions that, when executed on a computing system, cause the computing system to perform operations comprising:
- receiving a request from a user to create a volume;
- identifying that the volume is configured for accelerated creation of target volumes;
- accessing an acceleration pool including a plurality of source volumes, wherein each of the plurality of source volumes comprises a block representation of at least a portion of data for creating the volume;
- computing availability scores for at least some of the plurality of source volumes, wherein an availability score for a particular source volume is computed based on a state of the particular source volume to provide data to the volume, and wherein computing the availability score for the particular source volume comprises:
- determining a first value of a first availability parameter, wherein the first availability parameter is a percentage of the data of the volume that has been copied to the particular source volume from an object representation; and
- computing the availability score for the particular source volume based at least partly on the first value;
- selecting, from acceleration pool, a particular source volume to use for creating the volume, wherein the selecting is based at least partly on the availability scores; and
- creating the volume by sending blocks of data from the particular source volume to the volume.

9. The non-transitory computer-readable media of claim 8, the operations further comprising handling user reads from and writes to the volume.

10. The non-transitory computer-readable media of claim 8, the operations further comprising preventing user reads from and writes to the particular source volume.

11. The non-transitory computer-readable media of claim 8, wherein the availability score for the particular source volume is further computed based on a type of hardware used to store the particular source volume.

12. The non-transitory computer-readable media of claim 8, wherein the availability score for the particular source volume is further computed based on a network distance between the particular source volume and the volume.

13. The non-transitory computer-readable media of claim 8, the operations further comprising:
- causing display of a first acceleration status indication before a threshold level of completion of the acceleration pool; and
- causing display of a second acceleration status indication after the threshold level of completion of the acceleration pool.

* * * * *